Jan. 3, 1928. 1,655,010
J. BUCHLI
DRIVING ARRANGEMENT FOR ELECTRICALLY DRIVEN RAIL VEHICLES
Filed Feb. 24, 1927
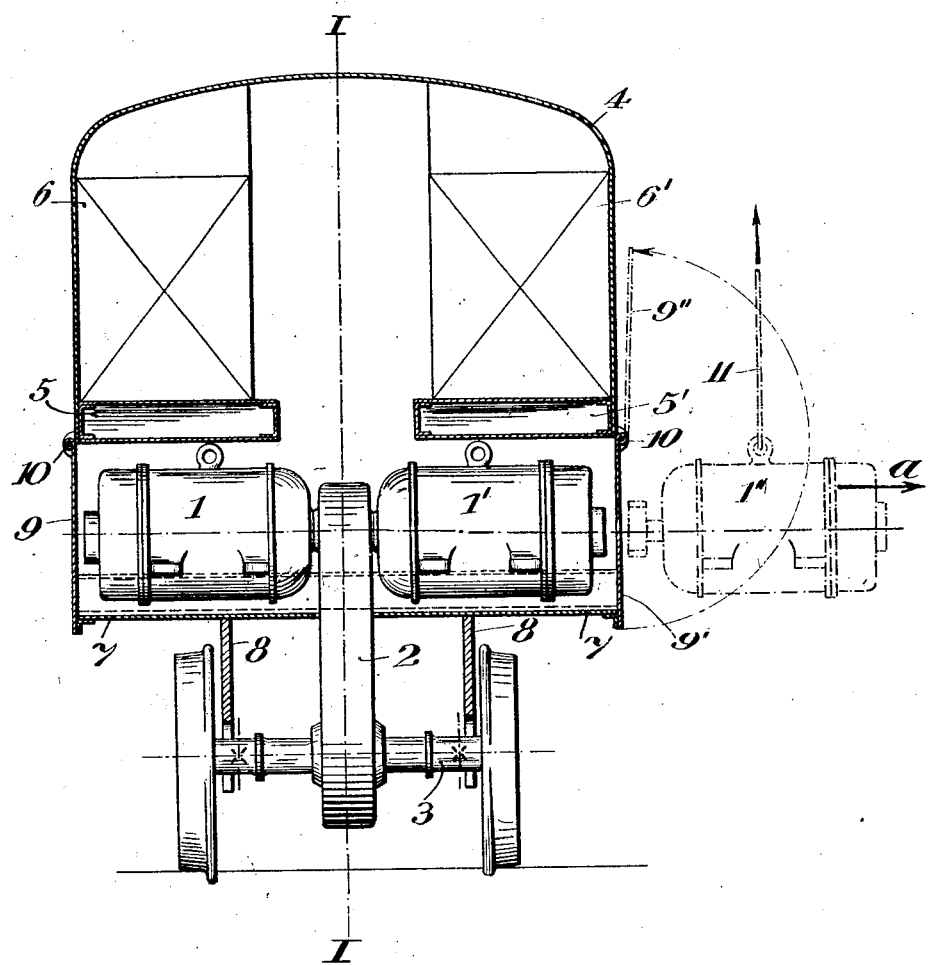
Inventor:
Jacob Buchli, Patented Jan. 3, 1928.

1,655,010

UNITED STATES PATENT OFFICE.

JACOB BUCHLI, OF WINTERTHUR, SWITZERLAND.

DRIVING ARRANGEMENT FOR ELECTRICALLY-DRIVEN RAIL VEHICLES.

Application filed February 24, 1927, Serial No. 170,698, and in Germany June 21, 1926.

The present invention is an improvement in or modification of the driving arrangement for electrically driven vehicles in which each driving wheel axle is separately driven by its own motor or motors.

With the hitherto known driving arrangements for electrically driven locomotives the motors are either arranged in the manner of street car motors; i. e. adapted to oscillate about the driving axles, or are rigidly fixed to parts of the frame and between high parts of the latter. These arrangements necessitate that the removal of the motors has to be performed either in the downward direction or in the upward direction in which case the roof or at least a part of the latter has to be removed.

In order to permit a removal of the motors in the downward direction pits with lateral gangways and lifting tackle must be provided so that the motors can be lowered, moved laterally and lifted again up to the height of the floor of the work room. The second manner of removing the motors necessitates an overhead crane for removing the roof of the locomotive, whereupon the motor is lifted by the crane and put down at a suitable spot. Thereby a considerable height is required which is not always available in old locomotive works and in round houses. Both methods of removing the motors are tedious, expensive and take up much time, quite apart from the fact that, for instance, a frequent dismantling of the roof damages the latter and impairs its tightness.

The driving arrangement according to the present invention permits, owing to the arrangement of the motors symmetrically to the longitudinal central plane of the locomotive, the erection and removal of these motors in a very simple manner. Flap doors are provided in the longitudinal walls of the locomotive body through which the motors can be withdrawn and inserted. Parts of the electrical equipment arranged above the motors do not hinder the removal of the latter; in the same manner the flap doors, which can be made of any suitable type and which can remain preferably rigidly connected to the locomotive body, do not hinder that removal.

The technical progress involved by this arrangement consists therefor principally in the fact that the motors may be withdrawn from the locomotive or inserted into the latter in the most simple manner without necessitating a previous dismantling of any other parts. Furthermore during the stoppage of the locomotive inspection of the motors and refilling the lubricating devices may conveniently be carried out.

A constructional example of the subject matter of the present invention is illustrated in a diagrammatic manner on the accompanying drawing.

The motors 1 and 1' arranged symmetrically to the longitudinal central plane I—I drive through transmission gearings enclosed in a casing 2 the driving wheel axle 3. The electrical equipment 6, 6' and the like is placed inside the locomotive upon supports 5 and 5'. Between the latter and the floor plate 7 which rests upon the locomotive frame 8 there is the space for housing the motors accessible from outside by the flap doors 9, 9'.

If, for instance, the motor 1' has to be removed the flap 9' is turned about its horizontal axis 10 into the position 9'', whereupon the motor 1' is withdrawn in the horizontal direction as indicated by the arrow $a$ and suspended by the cable 11 of a crane or a lifting tackle and is then moved from the position 1'' to the place of working. In fixing the motors in position the succession of these steps in inversed.

Obviously the flap doors may be turnable about any axis, for instance about a horizontal axis arranged at the lower end of the door, in which case they may serve as support on which the motors slide on being withdrawn laterally.

I claim:

1. In an electrically driven rail vehicle, in combination, a vehicle body, having openings in its lateral walls, driving wheel axles, electric motors, transmission gearings interposed between said electric motors and said driving wheel axles whereby each driving axle is separately driven by its own motor or motors, said electric motors being so arranged in the body of the vehicle that the motors may be removed through said openings without necessitating a dismantling of parts of the vehicle body, and readily removable means for closing said opening.

2. In an electrically driven rail vehicle, in combination, a vehicle body having openings in its lateral walls, driving wheel axles, electric motors, transmission gearings interposed between said electric motors and said driving wheel axles whereby each driving axle is separately driven by its own motor or motors, said electric motors being so arranged in the body of the vehicle that the motors may be removed through said openings without necessitating a dismantling of parts of the vehicle body, and flap doors for closing said openings.

3. In an electrically driven rail vehicle, in combination, a vehicle body having openings in its lateral walls, driving wheel axles, motors arranged symmetrically to the longitudinal centre plane of the vehicle, transmission gearings interposed between said electric motors and said driving axles whereby each driving axle is separately driven by one pair of motors, said electric motors being so arranged in the body of the vehicle that the motors may be removed through said openings without necessitating a dismantling of parts of the vehicle body, and flap doors for closing said openings.

In testimony whereof, I have signed my name to this specification.

JACOB BUCHLI.